United States Patent
Kase

(10) Patent No.: US 7,676,572 B2
(45) Date of Patent: Mar. 9, 2010

(54) DIAGNOSTIC INFORMATION MANAGEMENT SYSTEM

(75) Inventor: Noriko Kase, Tokyo (JP)

(73) Assignee: Yokogawa Electric Company, Tokyo (JP)

( * ) Notice: Subject to any disclaimer, the term of this patent is extended or adjusted under 35 U.S.C. 154(b) by 520 days.

(21) Appl. No.: 11/630,055

(22) PCT Filed: Jun. 16, 2005

(86) PCT No.: PCT/JP2005/011057

§ 371 (c)(1),
(2), (4) Date: Dec. 18, 2006

(87) PCT Pub. No.: WO2005/124489

PCT Pub. Date: Dec. 29, 2005

(65) Prior Publication Data

US 2008/0065743 A1    Mar. 13, 2008

(30) Foreign Application Priority Data

Jun. 17, 2004    (JP)    ............... 2004-180022

(51) Int. Cl.
*G06F 15/173*    (2006.01)
(52) U.S. Cl. ................. 709/224; 714/4; 714/25; 714/39
(58) Field of Classification Search ............. 709/223, 709/224; 714/4, 25, 39, 2
See application file for complete search history.

(56) References Cited

U.S. PATENT DOCUMENTS

| 4,670,834 A * | 6/1987 | Byal et al. ............ 700/81 |
|---|---|---|
| 6,865,691 B1 * | 3/2005 | Brundridge et al. ........ 714/25 |
| 2002/0091563 A1 * | 7/2002 | Wasa ................. 705/10 |
| 2004/0163011 A1 * | 8/2004 | Shaw ............... 714/25 |
| 2006/0143493 A1 * | 6/2006 | Meis et al. ............ 714/4 |

FOREIGN PATENT DOCUMENTS

| JP | 04058169 A | * 2/1992 |
|---|---|---|
| JP | 9-33298 | 2/1997 |
| JP | 2003-47172 | 2/2003 |
| JP | 2004-54555 | 2/2004 |
| JP | 2004-54750 | 2/2004 |

OTHER PUBLICATIONS

International Preliminary Report on Patentability and Written Opinion of the International Searching Authority issued in PCT/JP2005/011057 on Jan. 4, 2007 (5 pages).
International Search Report, Sep. 6, 2005.

* cited by examiner

*Primary Examiner*—Oanh Duong
(74) *Attorney, Agent, or Firm*—Westerman, Hattori, Daniels & Adrian, LLP

(57) ABSTRACT

A diagnostic information management system having a field controller which sends diagnostic information indicating contents of a failure which occurs in the field, to a viewer via a network; and the viewer which displays the diagnostic information sent from the field controller, on a screen. The field controller has a storage section which stores diagnostic information that becomes master diagnostic information of the whole system. The viewer compares the diagnostic information held by itself with the master diagnostic information, and obtains the difference diagnostic information from the field controller side.

6 Claims, 4 Drawing Sheets

FIG. 2

Diagnostic information operation window–[SCS0101]

| Print | Confirmation | Delete | Update | Help |
|---|---|---|---|---|

| | Message No. | Occurrence time | Class | Character string of message |
|---|---|---|---|---|
| 1 ◆ | 0200 | 2003/03/05 18:00:30 | 4 | SCS0101 System Shutdown |
| 2 ◆ | 0100 | 2003/03/05 15:10:10 | 1 | SCS0101 IO error |
| 3 ◆ | 0001 | 2003/03/05 14:40:00 | 2 | SCS0101 Security Switch OFF |

| | Message No. | Occurrence time | Class | Character string of message |
|---|---|---|---|---|
| 1 | 0002 | 2003/03/05 16:40:00 | 2 | SCS0101 Security Switch OFF Still |
| | ..... | ..... | | ..... |

3/3

90
91

DIAGNOSTIC INFORMATION MANAGEMENT SYSTEM

BACKGROUND OF THE INVENTION

1. Field of the Invention

The present invention relates to a diagnostic information management system in which a failure which occurs in a field is notified to a viewer via a network, and the viewer displays diagnostic information to notify the operator of the failure occurrence.

2. Description of the Related Art

FIG. 3 is a view showing a configuration example of a diagnostic information management system of a related art.

In the diagnostic information management system shown in FIG. 3, a field controller 20 and viewers 30, 40 are connected via a network 10.

Diagnosing section 21 of the field controller 20 diagnoses whether or not a failure occurs in the field. The diagnosing section 21 diagnoses, for example, an output signal of a sensor installed in the field, and, when the signal keeps showing an abnormal value, diagnoses that a signal line is broken. When detecting a failure which occurs in the field, the diagnosing section 21 notifies diagnostic information transmitting section 22 of the failure occurrence. The diagnostic information transmitting section 22 transmits diagnostic information indicating the contents of the failure to the all viewers 30, 40 connected to the network 10.

The field is a plant of, for example, the petroleum chemistry, iron and steel, paper and pulp, food, medicine, or electric power.

The viewers 30, 40 receive the broadcasted diagnostic information, and store it into diagnostic information buffers 31, 41. When the operators of the viewers 30, 40 open diagnostic information windows by the window displaying sections 32, 42, the diagnostic information stored in the diagnostic information buffers 31, 41 is displayed.

FIG. 4 is a view showing a screen example of the diagnostic information window displayed in the diagnostic information management system shown in FIG. 3.

In the diagnostic information window of FIG. 4, the operator performs a confirmation operation or a delete operation on the diagnostic information through a confirmation button 50 or a delete button 51. Then, the contents of the diagnostic information buffer 31 or 41 of FIG. 3 are changed.

JP-A-9-33298 discloses an equipment diagnosis system in which diagnostic results of equipment devices are displayed on a screen.

SUMMARY OF THE INVENTION

However, the diagnostic information management system shown in FIG. 3 has the following problems.

(a) When the viewer is not activated, it is impossible to obtain diagnostic information.

(b) When the viewer fails to receive broadcasted diagnostic information, the diagnostic information is missing.

(c) In the case where there are plural viewers, contents of diagnostic information buffers of the viewers may differ depending on situations of the confirmation operation or the delete operation.

It is an object of the invention to provide a diagnostic information management system in which, when a viewer is activated, diagnostic information can be obtained by going back to the past, and diagnostic information can be equalized between a field controller and the viewer.

The present invention provides a diagnostic information management system comprising:

a field controller which sends diagnostic information indicating contents of a failure which occurs in the field, to a viewer via a network; and the viewer which displays the diagnostic information sent from the field controller, on a screen, wherein the field controller has:

a first storage section which stores first diagnostic information including an identifier, the first diagnostic information indicating diagnostic contents of the failure which occurs in the field; and a diagnostic information transmitting section which stores the first diagnostic information in the first storage section, and which transmits the first diagnostic information to the viewer, and the viewer has:

a second storage section which stores second diagnostic information;

a diagnostic information receiving section which receives the first diagnostic information sent from the field controller; and a difference detecting section which detects a difference between the first diagnostic information and the second diagnostic information based on the identifier included in the first diagnostic information.

In the diagnostic information management system, the second storage section is a cache.

In the diagnostic information management system, the viewer has a state notifying section which, in accordance with confirmation or deletion of the second diagnostic information that is operated by a user of the viewer, notifies a state of the diagnostic information being confirmed or deleted, and the field controller has a diagnostic information managing section which changes the first diagnostic information based on the notification received from the viewer.

In the diagnostic information management system, the first diagnostic information includes the identifier, the diagnostic contents, and information indicating a state of confirmation or deletion.

In the diagnostic information management system, a plurality of the viewers are connected to the field controller via the network, and when the first diagnostic information is changed based on a notification from one of the viewers, the diagnostic information managing section notifies other viewers of the change of the diagnostic information.

In the diagnostic information management system, the diagnostic information transmitting section stores the first diagnostic information in the first storage section also during a period when the viewer is halted.

According to the diagnostic information management system of the invention, the diagnostic information can be equalized between the field controller and the viewer.

The diagnostic information includes the identifier. Therefore, excess or deficiency of the diagnostic information can be detected between the viewer and the field controller, and the field controller can upload only the difference to the viewer.

The diagnostic information includes the information indicating the state of confirmation or deletion. Even when a confirmation or delete operation is performed on the viewer side, the diagnostic information can be equalized between the field controller and the viewer.

When the first diagnostic information stored in the field controller is set as master information of the whole system, all of the viewers in the system can display the same information.

Also during a period when the viewer is halted, the field controller stores the first diagnostic information into the storage section. When the viewer is activated, therefore, the diagnostic information can be obtained by going back to the past, and the cause of a failure can be analyzed.

BRIEF DESCRIPTION OF THE DRAWINGS

FIG. 2 is a view showing a screen example of a diagnostic information window displayed in the diagnostic information management system of FIG. 1.

Figure 1:
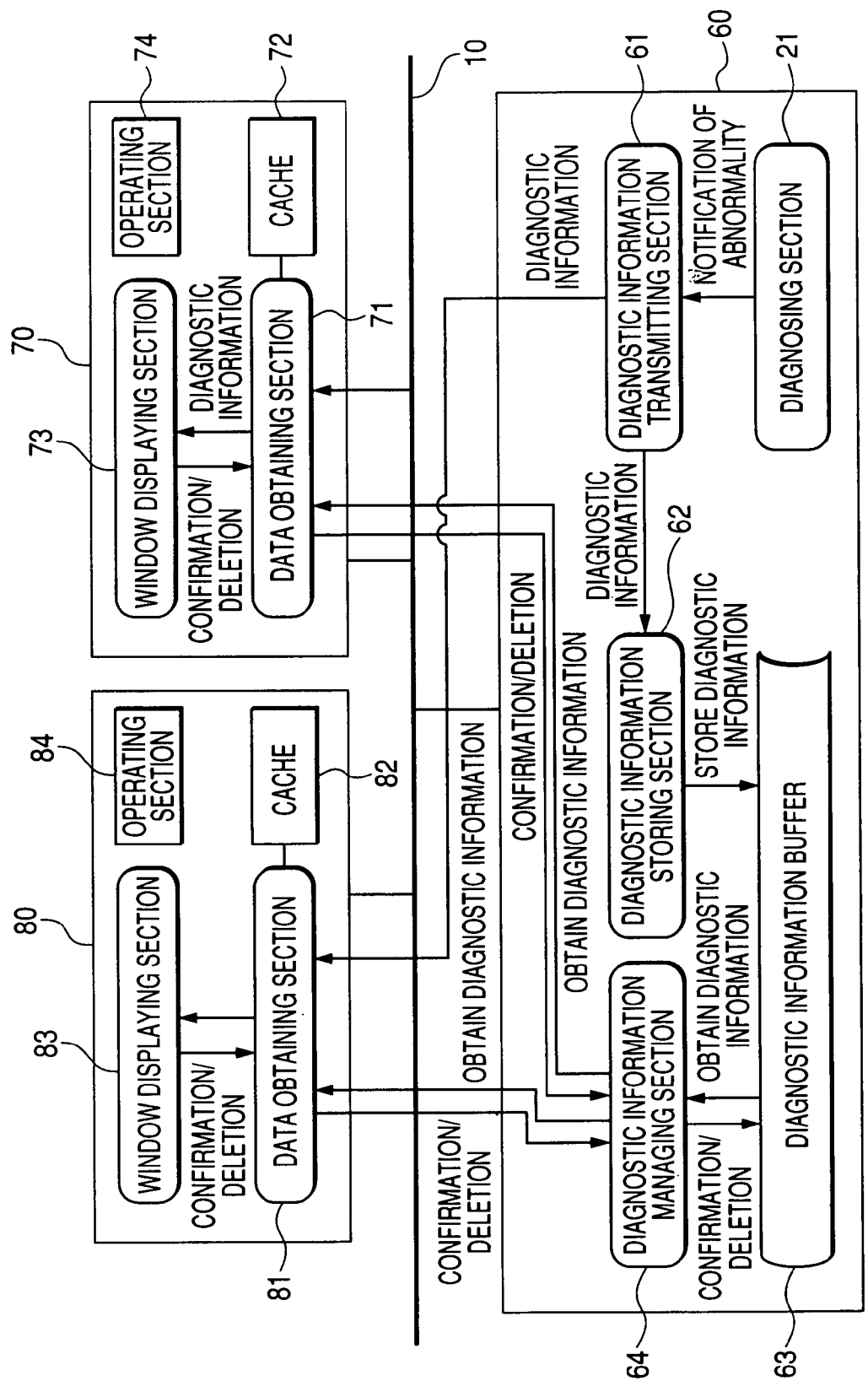
FIG. 1 is a diagram showing a diagnostic information management system of an embodiment of the invention.

DESCRIPTION OF REFERENCE NUMERALS AND SIGNS 10 network
21 diagnosing section
60 field controller
61 diagnostic information transmitting section
62 diagnostic information storing section
63 diagnostic information buffer
64 diagnostic information managing section
71, 81 data obtaining section
72, 82 cache
73, 83 window displaying section
74, 84 operating section

DETAILED DESCRIPTION OF AN EXEMPLARY EMBODIMENT

Hereinafter, the invention will be described in detail with reference to the drawings.

Figure 3:
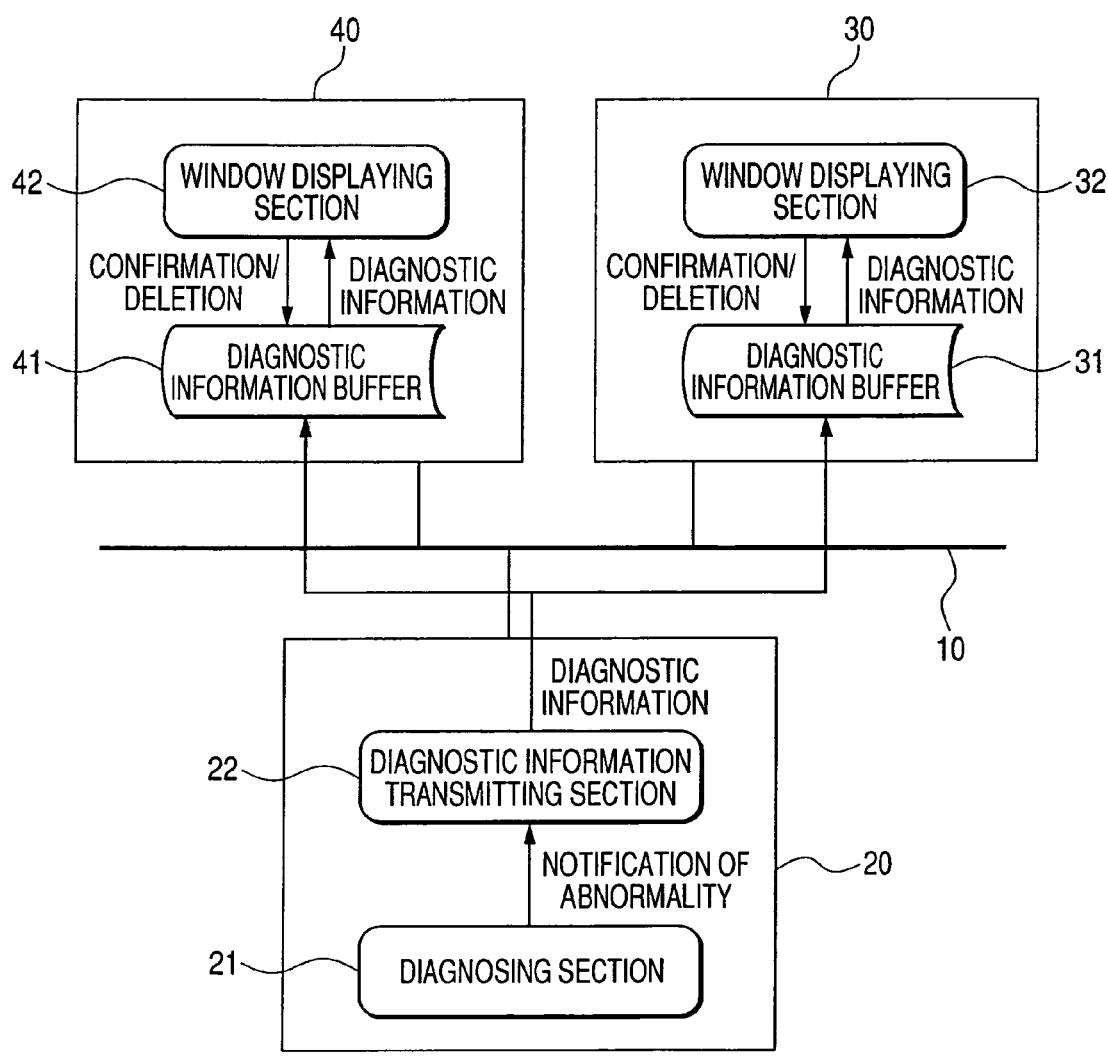
FIG. 3 is a view showing a configuration example of a diagnostic information management system of a related art.

FIG. 1 is a diagram showing a diagnostic information management system of an embodiment of the invention. In FIG. 1, identical components as those of FIG. 3 are denoted by the same reference numerals.

In the diagnostic information management system shown in FIG. 1, a field controller 60 and viewers 70, 80 are connected via the network 10.

When detecting a failure which occurs in the field, the diagnosing section 21 of the field controller 60 notifies diagnostic information transmitting section 61 of the failure occurrence. The diagnostic information transmitting section 61 notifies diagnostic information storing section 62 of diagnostic information indicating the contents of the failure and the like, and then transmits the diagnostic information to the all viewers 70, 80 connected to the network 10. The diagnostic information storing section 62 stores the diagnostic information into a diagnostic information buffer 63 in the field controller 60. The diagnostic information stored in the diagnostic information buffer 63 includes the following information:

(a) ID (identifier);
(b) information indicating a state of confirmation/deletion of the diagnostic information; and
(c) diagnostic contents.

The diagnostic information of the diagnostic information buffer 63 becomes master information of the whole system.

Data obtaining sections 71, 81 of the viewers 70, 80 receive the diagnostic information transmitted from the diagnostic information transmitting section 61. By using the ID included in the diagnostic information, the data obtaining sections 71, 81 detect the difference between diagnostic information stored in caches 72, 82 of the viewers 70, 80, and the diagnostic information stored in the diagnostic information buffer 63.

For example, the ID is a serial number. Judging from lack of the serial numbers, the data obtaining sections 71, 81 detect that there is missing information in the diagnostic information.

The data obtaining sections 71, 81 notify diagnostic information managing section 64 of the ID of the missing information which is known as a result of the detection, and obtain the missing diagnostic information from the diagnostic information buffer 63. The obtained diagnostic information is stored in the caches 72, 82.

When the master diagnostic information stored in the diagnostic information buffer 63 is changed in accordance with a notification from one viewer 70, the diagnostic information managing section 64 notifies the other viewer 80 of the change of the diagnostic information.

As described above, diagnostic contents are equalized among the viewers 70, 80 and the field controller 60. Alternatively, the number of viewers may be three or more.

Also during a period when the viewers 70, 80 are halted, the diagnostic information transmitting section 61 stores the diagnostic information into the diagnostic information buffer 63.

When the operators of the viewers 70, 80 open diagnostic information windows by window displaying sections 73, 83, the diagnostic information stored in the caches 72, 82 is displayed.

When, in the diagnostic information windows, the operators perform a confirmation operation or a delete operation through operating sections 74, 84, the state of the diagnostic information is notified from the diagnostic information windows to the diagnostic information managing section 64 via the data obtaining sections 71, 81. The diagnostic information managing section 64 changes the states of confirmation and deletion of the diagnostic information in the diagnostic information buffer 63. As described above, diagnostic contents are equalized among the viewers 70, 80 and the field controller 60.

In this way, diagnostic contents are equalized among the viewers 70, 80 and the field controller 60, whereby all of the viewers in the system are enabled to display the same diagnostic information.

FIG. 2 is a view showing a screen example of the diagnostic information window displayed in the diagnostic information management system shown in FIG. 1.

When, in the diagnostic information window of FIG. 2, the operators operate a confirmation button 90 or a delete button 91, the states of confirmation and deletion of the caches 72, 82 are changed, and the changes are reflected in the contents of the diagnostic information buffer 63.

The diagnostic information of message No. "0002" displayed in the lower column of FIG. 2 is diagnostic information which has been deleted. When the diagnostic information of message No. "0002" is deleted by the delete button 91, the state of deletion is reflected in the diagnostic information of the viewers and the field controller.

The present application is based on Japanese Patent Application (No. 2004-180022) filed Jun. 17, 2004, and its disclosure is incorporated herein by reference.

[FIG. 1]
21 DIAGNOSING SECTION
61 DIAGNOSTIC INFORMATION TRANSMITTING SECTION
62 DIAGNOSTIC INFORMATION STORING SECTION
63 DIAGNOSTIC INFORMATION BUFFER
64 DIAGNOSTIC INFORMATION MANAGING SECTION
71, 81 DATA OBTAINING SECTION
72, 82 CACHE
73, 83 WINDOW DISPLAYING SECTION
74, 84 OPERATING SECTION
a CONFIRMATION/DELETION
b DIAGNOSTIC INFORMATION
c NOTIFICATION OF ABNORMALITY
d OBTAIN DIAGNOSTIC INFORMATION
e STORE DIAGNOSTIC INFORMATION

[FIG. 2]
90 Confirmation
91 Delete
a Diagnostic information operation window
b Print
c Update
d Help
e Message No.
f Occurrence time
g Class
h Character string of message

[FIG. 3]
21 DIAGNOSING SECTION
22 DIAGNOSTIC INFORMATION TRANSMITTING SECTION
31, 41 DIAGNOSTIC INFORMATION BUFFER
32, 42 WINDOW DISPLAYING SECTION
a CONFIRMATION/DELETION
b DIAGNOSTIC INFORMATION
c NOTIFICATION OF ABNORMALITY

Figure 4:
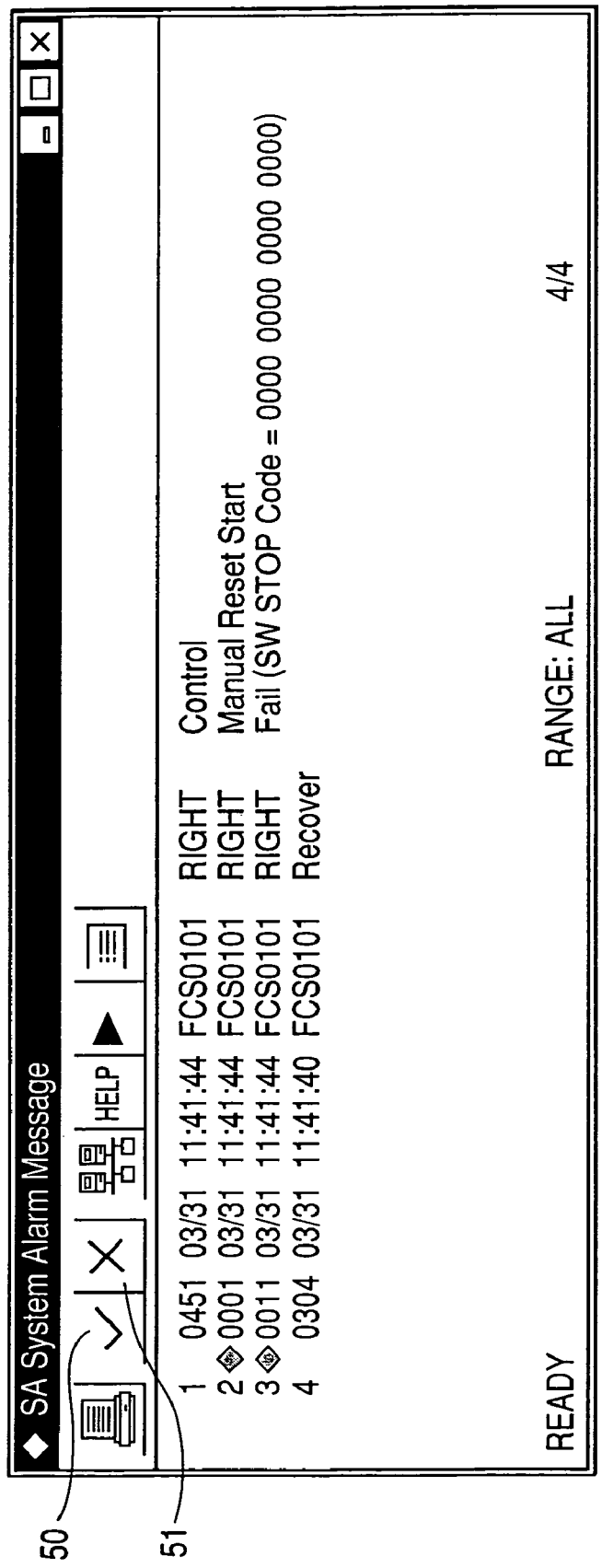
FIG. 4 is a view showing a screen example of a diagnostic information window displayed in the diagnostic information management system of FIG. 3.

[FIG. 4]
a Range: All
b Ready

The invention claimed is:

1. A diagnostic information management system comprising:
   a field controller which sends diagnostic information indicating contents of a failure which occurs in a field, to a viewer via a network; and
   the viewer which displays the diagnostic information sent from the field controller, on a screen,
   wherein the field controller has:
   a first storage section which stores first diagnostic information including an identifier, the first diagnostic information indicating diagnostic contents of the failure which occurs in the field; and
   a diagnostic information transmitting section which stores the first diagnostic information in the first storage section, and which transmits the first diagnostic information to the viewer, and
   the viewer has:
   a second storage section which stores second diagnostic information;
   a diagnostic information receiving section which receives the first diagnostic information sent from the field controller; and
   a difference detecting section which detects a difference between the first diagnostic information and the second diagnostic information based on the identifier included in the first diagnostic information.

2. A diagnostic information management system according to claim 1, wherein the second storage section is a cache.

3. A diagnostic information management system according to claim 1, wherein the viewer has a state notifying section which, in accordance with confirmation or deletion of the second diagnostic information that is operated by a user of the viewer, notifies a state of the diagnostic information being confirmed or deleted, and
the field controller has a diagnostic information managing section which changes the first diagnostic information based on the notification received from the viewer.

4. A diagnostic information management system according to claim 3, wherein the first diagnostic information includes the identifier, the diagnostic contents, and information indicating a state of confirmation or deletion.

5. A diagnostic information management system according to claim 3, wherein a plurality of the viewers are connected to the field controller via the network, and
when the first diagnostic information is changed based on a notification from one of the viewers, the diagnostic information managing section notifies other viewers of the change of the diagnostic information.

6. A diagnostic information management system according to claim 1, wherein the diagnostic information transmitting section stores the first diagnostic information in the first storage section also during a period when the viewer is halted.

* * * * *